United States Patent
Huang et al.

(10) Patent No.: US 12,025,768 B2
(45) Date of Patent: Jul. 2, 2024

(54) GENERATION OF WEATHER ANALYTICAL SCENARIOS TRANSLATING LIKELY AIRPORT CAPACITY IMPACT FROM PROBABILISTIC WEATHER FORECAST

(71) Applicant: THE WEATHER COMPANY, LLC, Brookhaven, GA (US)

(72) Inventors: Shengchen Huang, Medford, MA (US); Jennifer Isidoro, Waltham, MA (US); Jeremie Juban, Waltham, MA (US); John Williams, Andover, MA (US)

(73) Assignee: THE WEATHER COMPANY, LLC, Brookhaven, GA (US)

(*) Notice: Subject to any disclaimer, the term of this patent is extended or adjusted under 35 U.S.C. 154(b) by 206 days.

(21) Appl. No.: 16/116,001

(22) Filed: Aug. 29, 2018

(65) Prior Publication Data
US 2020/0073014 A1    Mar. 5, 2020

(51) Int. Cl.
G01W 1/10 (2006.01)
G06N 7/01 (2023.01)
G06Q 10/109 (2023.01)

(52) U.S. Cl.
CPC .............. *G01W 1/10* (2013.01); *G06N 7/01* (2023.01); *G06Q 10/109* (2013.01)

(58) Field of Classification Search
CPC ........ G01W 1/10; G06Q 10/109; G06N 7/005
See application file for complete search history.

(56) References Cited

U.S. PATENT DOCUMENTS

| | | | |
|---|---|---|---|
| 7,027,898 B1* | 4/2006 | Leger | B64D 43/00 701/14 |
| 8,121,778 B2 | 2/2012 | Brozat | |
| 9,076,327 B1 | 7/2015 | Baiada et al. | |
| 2003/0004780 A1 | 1/2003 | Smith et al. | |
| 2005/0090969 A1 | 4/2005 | Siok et al. | |
| 2008/0086290 A1* | 4/2008 | Wilson | G06Q 10/0637 705/7.36 |
| 2011/0301829 A1* | 12/2011 | White | G08G 5/0043 701/120 |
| 2012/0245836 A1* | 9/2012 | White | G08G 5/0043 701/120 |
| 2013/0013182 A1 | 1/2013 | Bertsimas et al. | |

(Continued)

OTHER PUBLICATIONS

Ayhan et al., Aircraft Trajectory Prediction Made Easy with Predictive Analytics, 2016, ACM, pp. 1-10 (Year: 2016).*

(Continued)

*Primary Examiner* — Boris Gorney
*Assistant Examiner* — Bernard E Cothran
(74) *Attorney, Agent, or Firm* — Barnes & Thornburg LLP (57) ABSTRACT

Methods and systems for predicting airport capacity impact using a probabilistic weather forecast are disclosed. A method includes: receiving, by a computing device, a probabilistic weather forecast including a plurality of weather scenarios; determining, by the computing device, an airport capacity prediction for each of the plurality of weather scenarios included in the probabilistic weather forecast; clustering, by the computing device, the airport capacity predictions; and generating, by the computing device, at least one aggregated airport capacity prediction using the clustered airport capacity predictions.

20 Claims, 7 Drawing Sheets

(56) References Cited

U.S. PATENT DOCUMENTS

2017/0140656 A1  5/2017 Mott et al.

OTHER PUBLICATIONS

Chen et al., Using Weather Translation and Machine Learning to Identify Similar Weather Impact Days, Jan. 2017, pp. 1-9 (Year: 2017).*
Wingrove III et al., The Aviation System Analysis Capability Boise Impact Model, Nov. 1998, NASA, pp. 1-40 (Year: 1998).*
Buxi et al., Generating Probabilistic Capacity Profiles from weather forecast: A design-of-experiment approach, 2011, University of California Berkeley, pp. 1-10 (Year: 2011).*
Alizadeh, An Illustrative Introduction to Dynamic Time Warping, Oct. 2020, Towards Data Science, pp. 1-10 (Year: 2020).*
Simpson et al., Potential Impacts of Advanced Technologies on the ATC Capacity of High-Density Terminal Areas, 1986, National Aeronautics and Space Administration, pp. 1-173 (Year: 1986).*
Provan et al., Quantifying the Benefit of Temporal Correlation in Probabilistic Weather Forecasts for Strategic Air Traffic Management, Dec. 2012, Mosaic ATM, pp. 1-11 (Year: 2012).*
Fernandez-Peruchena, Post-processing for deterministic and probabilistic weather forecasting in PreFlexMS, Nov. 2016, CENER, pp. 1-31 (Year: 2016).*
Lee et al., The Aviation System Analysis Capability Airport Capacity and Delay Models, Apr. 1998, NASA, pp. 1-76 (Year: 1998).*
Chen et al., Chained Predictions of Flight Delay Using Machine Learning, 2017, American Institute of Aeronautics and Astronautics, pp. 1-16 (Year: 2017).*
Kicinger et al., "Airport Capacity Prediction with Explicit Consideration of Weather Forecast Uncertainty", Journal of Air Transportation, vol. 24, No. 1, Jan. 2016, 11 pages.

* cited by examiner

| Weather Analytical Scenario 1 | |
|---|---|
| 70% Probability | |
| XX 01 | Cancel |
| XX 15 | Cancel |
| XX 20 | Delay |
| XX 27 | Delay |

| Weather Analytical Scenario 2 | |
|---|---|
| 30% Probability | |
| XX 01 | Cancel |
| XX 20 | Delay |
| XX 30 | Delay |

FIG. 7A

| Flight | Decision | Probability |
|---|---|---|
| XX 01 | Cancel | 100% |
| XX 15 | Cancel | 70% |
| XX 20 | Delay | 100% |
| XX 27 | Delay | 70% |
| XX 30 | Delay | 30% |

FIG. 7B

GENERATION OF WEATHER ANALYTICAL SCENARIOS TRANSLATING LIKELY AIRPORT CAPACITY IMPACT FROM PROBABILISTIC WEATHER FORECAST

BACKGROUND

The present invention generally relates to computing devices and, more particularly, to methods and systems for predicting airport capacity impact using a probabilistic weather forecast.

When facing disruptive weather conditions at a major hub airport, a deterministic weather forecast issued every three hours (e.g., a Terminal Area Forecast (TAF)), or a weather forecast issued in response to an ad-hoc request, is typically used by airlines to estimate potential airport capacity impact to the flight network and operations. Airlines typically rely on experience to interpret the weather forecast and make decisions with respect to flight operations, routing, crew scheduling, and passenger re-accommodations.

SUMMARY

In a first aspect of the invention, there is a method that includes: receiving, by a computing device, a probabilistic weather forecast including a plurality of weather scenarios; determining, by the computing device, an airport capacity prediction for each of the plurality of weather scenarios included in the probabilistic weather forecast; clustering, by the computing device, the airport capacity predictions; and generating, by the computing device, at least one aggregated airport capacity prediction using the clustered airport capacity predictions.

In another aspect of the invention, there is a computer program product that includes a computer readable storage medium having program instructions embodied therewith. The program instructions are executable by a computing device to cause the computing device to: receive a probabilistic weather forecast including a plurality of weather scenarios; determine an airport capacity prediction for each of the plurality of weather scenarios included in the probabilistic weather forecast; cluster the airport capacity predictions; generate at least one aggregated airport capacity prediction using the clustered airport capacity predictions; and display each of the at least one aggregated airport capacity prediction and an associated probability.

In another aspect of the invention, there is a system that includes: a hardware processor, a computer readable memory, and a computer readable storage medium associated with a computing device; program instructions configured to receive a probabilistic weather forecast including a plurality of weather scenarios; program instructions configured to determine an airport capacity prediction for each of the plurality of weather scenarios included in the probabilistic weather forecast; program instructions configured to smooth the airport capacity predictions; program instructions configured to cluster the airport capacity predictions; program instructions configured to generate at least one aggregated airport capacity prediction using the clustered airport capacity predictions; and program instructions configured to cancel or delay at least one flight based on the at least one aggregated airport capacity prediction, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for predicting airport capacity impact using a probabilistic weather forecast. As described herein, aspects of the invention include a method and system that receives a probabilistic weather forecast including a plurality of weather scenarios, determines an airport capacity prediction for each of the plurality of weather scenarios included in the probabilistic weather forecast, clusters the airport capacity predictions, and generates one or more aggregated airport capacity predictions using the clustered airport capacity predictions.

Conventionally, airlines manually interpret deterministic weather forecasts and manually make decisions regarding flight operations, routing, crew scheduling, and passenger re-accommodations. However, the manual interpretation of deterministic weather forecasts and the manual decision-making regarding flight operations, routing, crew scheduling, and passenger re-accommodations is typically reactive to a weather event and performed without using an objective weighing of the likelihood of a weather event, including timing and severity, on system and economic impacts. Accordingly, the manual decision-making may not be efficacious in minimizing system and economic impacts.

Embodiments of the invention address the above-mentioned shortcomings associated with conventional methods for interpreting weather forecasts and making decisions regarding flight operations, routing, crew scheduling, and passenger re-accommodations. As described herein, aspects of the invention include a method and system that automatically and proactively determines likely airport capacity impacts using probabilistic weather forecasts, accounting for weather parameters, flight demand, airport operational conditions, and historical behaviors by air traffic controllers. In addition, other aspects of the invention consolidate all possible capacity predictions to a handful of aggregated capacity predictions (weather analytical scenarios) that can be digested with ease by decision makers and used to understand the quantified risk level related to flight related actions (e.g., flight cancellations and delays, passenger re-accommodations, etc.). Accordingly, decision makers are enabled to make decisions that are efficacious in minimizing system and economic impacts.

A probabilistic weather forecast is an ensemble of a plurality of numerical weather models that is frequently updated and that provides a range of possible outcomes and occurrences. In an example, over 150 numerical weather models are ensembled in the probabilistic weather forecast. In other examples, different numbers of numerical weather models are ensembled in the probabilistic weather forecast.

In embodiments, the probabilistic weather forecast allows for quantifying a decision-making risk level from the weather forecast. For example, by combining probabilistic weather forecasts for ceiling and visibility, a likelihood of Visual Meteorological Conditions (VMCs) and Instrument Meteorological Conditions (IMCs) at an airport may be determined. VMCs and IMCs are key parameters in determining airport capacity values. Additional use cases include winter snow removal and deicing operations and staffing, major winter and tropical event irregular operations (IR-ROP) planning, passenger re-accommodation, and extreme weather impacts on staff, assets, and payload, among others. However, not all operational impacts can be predicted based solely on the weather forecast. For example, airport arrival and departure capacities rely not only on weather parameters such as ceiling, visibility, wind direction and wind speed, but also flight demand, air traffic controller behaviors, and current operational limitations (e.g., runway closures).

Embodiments provide a method and system that predicts airport impact and resulting impact to an airline network based on weather forecast and historical data using an artificial intelligence powered machine learning based airport capacity model that is trained to forecast airport arrival and departure capacity values. Instead of modeling the capacity value as a continuous variable, the proposed model treats each major capacity value as a category. A binary classification model is used to forecast the likelihood of a capacity change and also the likelihood of each capacity value category if there is a change. For an airport having five major arrival capacity values, five binary classification models are created and a proprietary capacity value determination postprocessing method is used to determine the most likely capacity value category for the specific time horizon.

In embodiments, with the use of probabilistic weather forecasts, the machine learning based airport capacity prediction model generates hundreds of likely capacity reduction and recovery outcomes, including timings, magnitudes, and durations. The forecasts are calibrated such that those outcomes are equal likely to occur. However, the timing, magnitudes and durations can be drastically different. The outcomes are consolidated into a smaller number of weather analytical scenarios that enumerate the outcomes of the system impact, such as airport capacity reduction and recovery, and quantify the risks with associated probabilities.

Embodiments improve the functioning of a computer by providing automated methods and systems for predicting airport capacity impact using a probabilistic weather forecast. In particular, embodiments improve software by providing a method and system that automatically determines likely airport capacity impacts using probabilistic weather forecasts, accounting for weather parameters, flight demand, airport operational conditions, and historical behaviors by air traffic controllers. Additionally, embodiments improve software by providing a method and system that consolidates all possible capacity reduction impacts to a handful of weather analytical scenarios. Additionally, implementations of the invention use techniques that are, by definition, rooted in computer technology (e.g., machine learning, probabilistic weather forecasts, weather analytical scenarios, dynamic time warping, etc.) that cannot be performed manually by a person.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
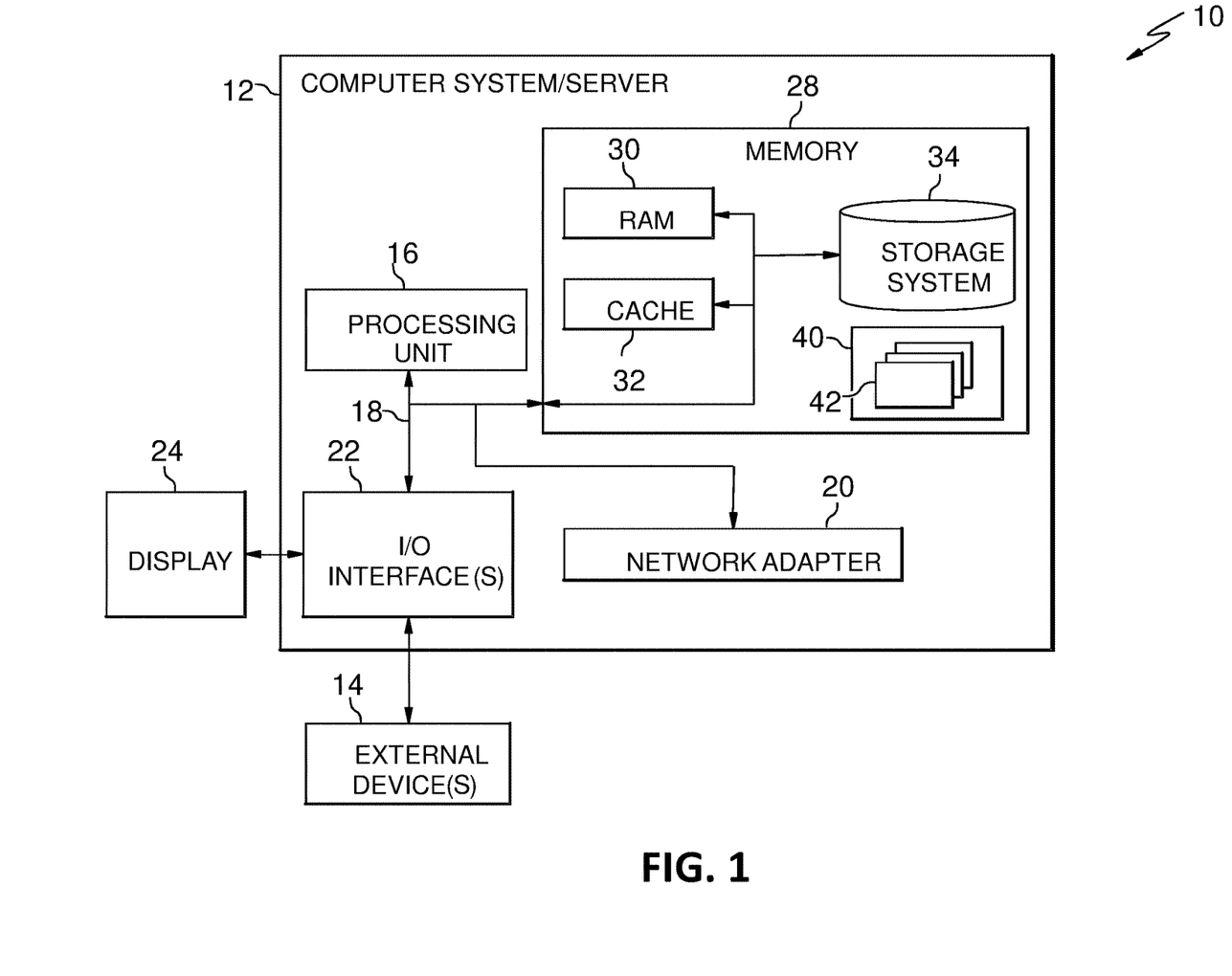
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
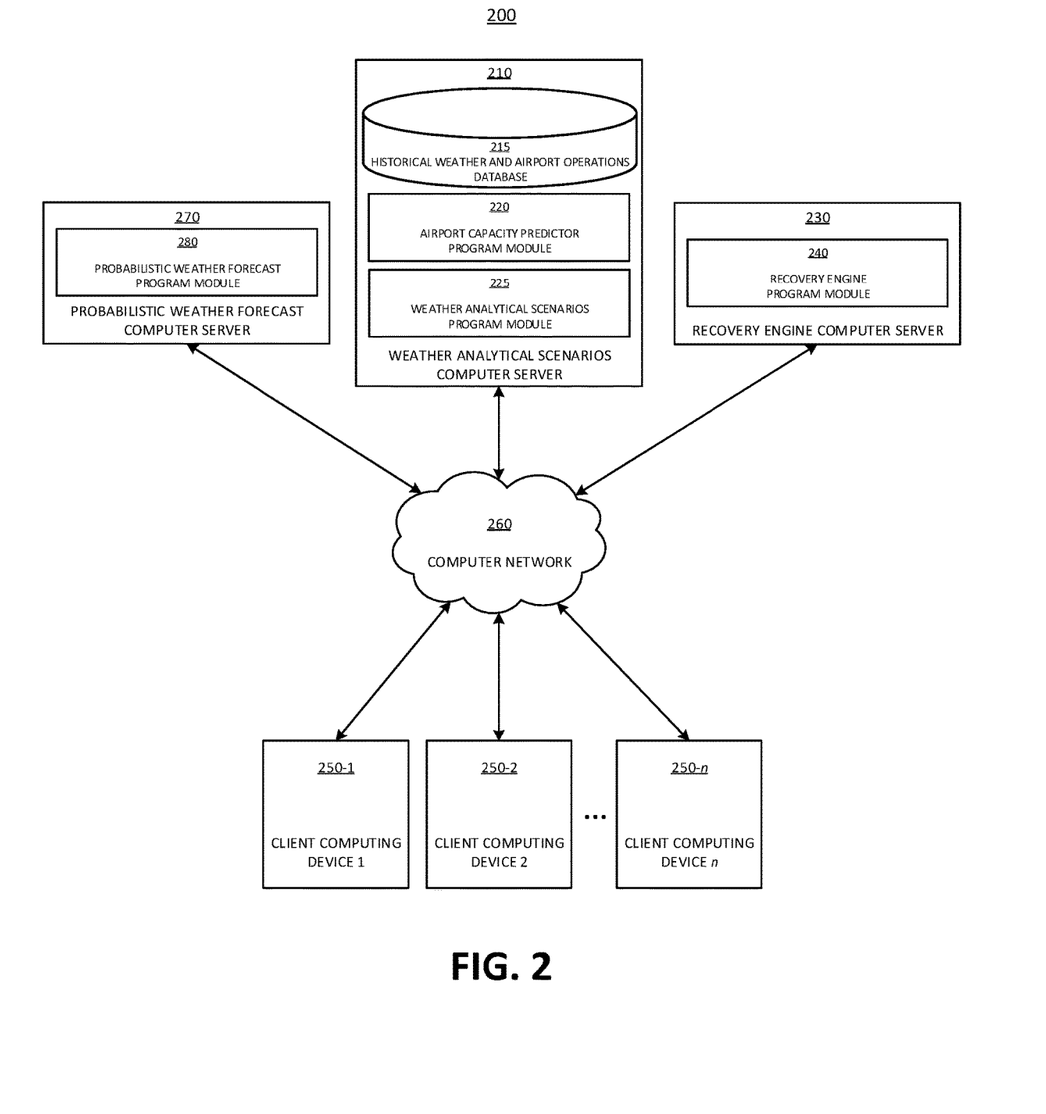
FIG. 2 depicts an illustrative environment in accordance with aspects of the invention.

FIG. 2 depicts an illustrative environment 200 in accordance with aspects of the invention. As shown, the environment 200 comprises a weather analytical scenarios computer server 210, a recovery engine computer server 230, a plurality of client computing devices 250-1, 250-2, . . . , 250-n, and a probabilistic weather forecast computer server 270 which are in communication via a computer network 260. In embodiments, the computer network 260 is any suitable network including any combination of a LAN, WAN, or the Internet. In embodiments, the weather analytical scenarios computer server 210, the recovery engine computer server 230, the plurality of client computing devices 250-1, 250-2, . . . , 250-n, and the probabilistic weather forecast computer server 270 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the weather analytical scenarios computer server 210 is a computer device comprising one or more elements of the computer system/server 12 (as shown in FIG. 1). In particular, the weather analytical scenarios computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the weather analytical scenarios computer server 210 includes a historical weather and airport operations database 215 that stores information about historical weather conditions at various points in time (e.g., hourly weather conditions over a period spanning the previous 3 years) and airport operations at those points in time (e.g., runway configuration, capacity, etc.). In an embodiment, the weather analytical scenarios computer server 210 automatically retrieves data from a third-party server or web service to populate the historical weather and airport operations database 215. In another embodiment, a user manually loads the historical weather and airport operations database 215 with the information about historical weather conditions and airport operations or specifies a location to be accessed by the weather analytical scenarios computer server 210 to obtain data to load into the historical weather and airport operations database 215.

Additionally, in embodiments, the weather analytical scenarios computer server 210 includes an airport capacity predictor program module 220 and a weather analytical scenarios program module 225, each of which includes hardware and/or software and is one or more of the program modules 42 shown in FIG. 1. According to an embodiment, the airport capacity predictor program module 220 includes program instructions for predicting the timing and magnitude of airport capacity changes using a probabilistic weather forecast. Additionally, according to an embodiment, the weather analytical scenarios program module 225 includes program instructions for aggregating the capacity predictions generated by the airport capacity predictor program module 220. In embodiments, the program instructions included in the airport capacity predictor program module 220 and the weather analytical scenarios program module 225 of the weather analytical scenarios computer server 210 are executed by one or more hardware processors.

Still referring to FIG. 2, in embodiments, the recovery engine computer server 230 is a computer device comprising one or more elements of the computer system/server 12 (as shown in FIG. 1). In particular, the recovery engine computer server 230 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the recovery engine computer server 230 includes a recovery engine program module 240, which includes hardware and/or software and is one or more of the program modules 42 shown in FIG. 1. According to an embodiment, the recovery engine program module 240 includes program instructions for determining an optimum set of flights to cancel and an optimum set of flights to delay based on weather analytical scenarios determined by the weather analytical scenarios program module 220. In embodiments, the program instructions included in the recovery engine program module 240 of the recovery engine computer server 230 are executed by one or more hardware processors.

Still referring to FIG. 2, in embodiments, each of the client computing devices 250-1, 250-2, . . . , 250-n is a computer device comprising one or more elements of the computer system/server 12 (as shown in FIG. 1) and is a desktop computer, a laptop computer, a mobile device such as a cellular phone, tablet, personal digital assistant (PDA), or other computing device. In other embodiments, each of the client computing devices 250-1, 250-2, . . . , 250-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the client computing devices 250-1, 250-2, . . . , 250-n receives information about the weather analytical scenarios generated by the weather analytical scenarios program module 225 on the weather analytical scenarios computer server 210. Additionally, each of the client computing devices 250-1, 250-2, . . . , 250-n receives information about the optimum set of flights to cancel and the optimum set of flights to delay determined by the the recovery engine program module 240 on the recovery engine computer server 230.

Still referring to FIG. 2, in embodiments, the probabilistic weather forecast computer server 270 is a computer device comprising one or more elements of the computer system/server 12 (as shown in FIG. 1). In particular, the probabilistic weather forecast computer server 270 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the probabilistic weather forecast computer server 270 includes a probabilistic weather forecast program module 280, which includes hardware and/or software and is one or more of the program modules 42 shown in FIG. 1. According to an embodiment, the probabilistic weather forecast program module 280 includes program instructions for generating a probabilistic weather forecast. In embodiments, the program instructions included in the probabilistic weather forecast program module 280 of the probabilistic weather forecast computer server 270 are executed by one or more hardware processors.

Figure 3:
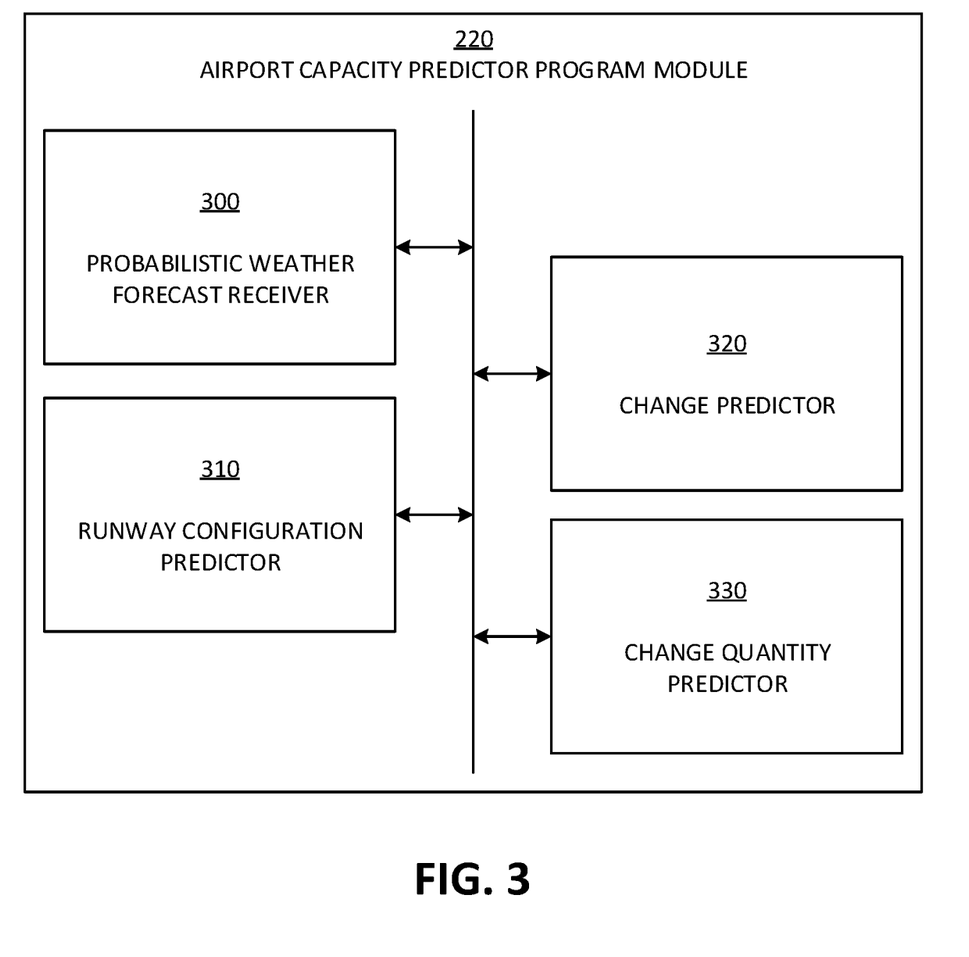
FIG. 3 depicts a block diagram of an exemplary program module in accordance with aspects of the invention.

FIG. 3 depicts a block diagram of an exemplary airport capacity predictor program module 220 in the weather analytical scenarios computer server 210 (of FIG. 2) in accordance with aspects of the invention. In embodiments, the airport capacity predictor program module 220 includes a probabilistic weather forecast receiver 300, a runway configuration predictor 310, a change predictor 320, and a change quantity predictor 330, each of which comprises one or more program modules 42 as described with respect to FIG. 1. In other embodiments, the airport capacity predictor program module 220 includes additional or fewer components than those shown in FIG. 3. In other embodiments, separate components are integrated into a single computing component or module. Additionally, or alternatively, in embodiments, a single component is implemented as multiple computing components or modules. According to another embodiment, the functions of one or more of the probabilistic weather forecast receiver 300, the runway configuration predictor 310, the change predictor 320, and the change quantity predictor 330 are provided as services in a distributed computing environment.

In embodiments, the probabilistic weather forecast receiver 300 receives a probabilistic weather forecast for a particular airport from a service provider (e.g., using a web service) such as the probabilistic weather forecast program module 280 of the probabilistic weather forecast computer server 270. The probabilistic weather forecast is received by the probabilistic weather forecast receiver 300 in the form of prototypes (i.e., equal probability samples from a distribution). The prototypes from the probabilistic weather forecast include a predetermined number of equally likely weather scenarios for the particular airport. In an example, the probabilistic weather forecast includes 100 equally likely weather scenarios for the particular airport.

In embodiments, the probabilistic weather forecast received by the probabilistic weather forecast receiver 300 is a multivariate forecast that includes, for each weather scenario, forecast weather data for the particular airport such as temperature, dewpoint, windspeed, wind direction, ceiling, and visibility. In other embodiments, additional forecast weather data for the particular airport is also provided.

In embodiments, for each weather scenario, forecast information is provided for the particular airport for each of a predetermined number of time intervals. In an example, each weather scenario includes forecast information for the particular airport for each hour over a twelve-hour period. In another example, each weather scenario includes forecast information for the particular airport for each hour over a twenty-four-hour period. In other embodiments, forecast information for the particular airport may be provided for other intervals (e.g., 30-minute intervals) or for other time periods (e.g., a forty-eight-hour period).

Still referring to FIG. 3, in embodiments, the runway configuration predictor 310 uses the probabilistic weather forecast for the particular airport received by the probabilistic weather forecast receiver 300 to predict runway configurations at the particular airport. In particular, for each weather scenario in the probabilistic weather forecast, the runway configuration predictor 310 predicts runway configurations at the particular airport using historical data regarding weather conditions and runway configurations from the historical weather and airport operations database 215.

In embodiments, the runway configuration predictor 310 uses machine learning techniques to build a classification model using historical data regarding weather conditions, runway configurations, and air traffic controller behavior regarding a permitted number of arrivals and/or departures from the historical weather and airport operations database 215.

The runway configuration predictor 310 then uses the classification model to predict a runway configuration at the particular airport based upon the forecast information for each of the weather scenarios in the probabilistic weather forecast. More specifically, for each of the weather scenarios in the probabilistic weather forecast, for each time interval having associated forecast information in the weather scenario, the runway configuration predictor 310 predicts the runway configuration at the particular airport by performing a classification based on the classification model using the forecast information. In embodiments, the runway configuration predictor 310 uses information about closed runways (e.g., closed for maintenance) in predicting the runway configuration. In other embodiments, the classification model may also be used to predict an available number of arrival or depart slots associated with the weather conditions and the runway configuration.

Accordingly, in the example in which each weather scenario includes forecast information for each hour over a 12-hour period, the runway configuration predictor 310 predicts the runway configuration at each of the 12 hours for the weather scenario. Therefore, if there are 100 weather scenarios, the runway configuration predictor 310 predicts 1,200 runway configurations (i.e., 12 predictions per weather scenario multiplied by 100 weather scenarios).

Still referring to FIG. 3, in embodiments, the change predictor 320 uses the predicted runway configurations for each scenario from the runway configuration predictor 310 as well as historical data regarding weather conditions, capacity associated with the historical weather conditions, and demand associated with the particular time from the historical weather and airport operations database 215 to predict, for each scenario, the timing of airport capacity changes. In particular, for each weather scenario, the change predictor 320 determines, for each pair of successive time intervals, whether or not there is a change in airport capacity at the particular airport.

In embodiments, the change predictor 320 determines that a change in capacity occurs when demand for arrival or departure slots is predicted to exceed the number of available arrival or departure slots. As discussed above, the number of available arrival/departure slots associated with the weather conditions and the runway configuration is predicted using the classification model, and the arrival/departure demand is determined using historical information stored in the historical weather and airport operations database 215.

For example, if the runway configuration predictor 310 predicts that a particular airport will use both of its two runways at 6 a.m., 7 a.m., 8 a.m., and 9 a.m., will use a single runway at 10 a.m., 11 a.m., noon, and 1 p.m., and both of its runways at 2 p.m., 3 p.m., 4 p.m., and 5 p.m., the change predictor 320 determines that there is a change in runway configuration at 10 a.m. and again at 2 p.m. However, the change in runway configuration does not necessarily correspond to the same change in airport capacity. For example, if data obtained by change predictor 320 the from the historical weather and airport operations database 215 indicates that with the two-runway configuration there can be either 60 or 45 available arrival slots per hour, depending on the weather conditions, and 30 available arrival slots with the one-runway configuration, the change quantity predictor 330 determines the value for the arrival slots per hour between 6 a.m. and 9 a.m. and again between 2 p.m. and 5 p.m. If there are 100 weather scenarios, the change predictor 320 predicts 100 sets of capacity change times, one for each weather scenario.

Still referring to FIG. 3, in embodiments, the change quantity predictor 330 uses the runway configurations predicted for each scenario by the runway configuration predictor 310 as well as the capacity change times predicted by the change predictor 320 to predict, for each weather scenario, a magnitude of a capacity change at each of the capacity change times. In particular, for each weather scenario, the change quantity predictor 330 determines, for each capacity change time identified by the change predictor 320, a change in the quantity of flights at the particular airport. In embodiments, the change quantity predictor 330 determines a change in the quantity of arriving flights as well as a change in the quantity of departing flights for each pair of successive time intervals.

In embodiments, the change quantity predictor 330 uses the number of available arrival/departure slots associated with the weather conditions and the runway configuration (determined using the classification model, as discussed above) as well as arrival/departure demand associated with the particular time (either using actual demand data or using historical demand data from the historical weather and airport operations database 215) to predict the change in the quantity of flights that at the particular airport.

In embodiments, the predictions generated by the change predictor 320 and the change quantity predictor 330 are both scored based upon how close they are to the actual airport conditions (e.g., capacity change times and capacity change magnitudes). Machine learning is used to tune the classification model in order to improve the accuracy of the model over time. In embodiments, the scoring is performed with respect to the predictions after they have been smoothed by the capacity smoother 400, as discussed below.

Figure 4:
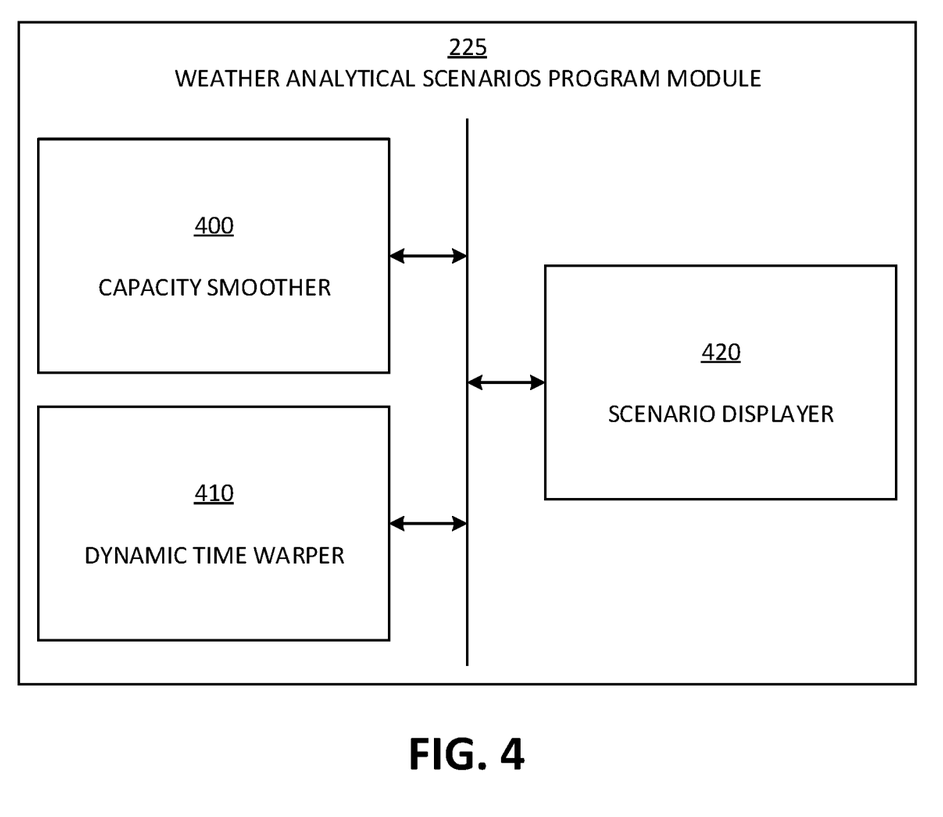
FIG. 4 depicts a block diagram of another exemplary program module in accordance with aspects of the invention.

FIG. 4 depicts a block diagram of a weather analytical scenarios program module 225 in the weather analytical scenarios computer server 210 (of FIG. 2) in accordance with aspects of the invention. In embodiments, the weather analytical scenarios program module 225 includes a capacity smoother 400, a dynamic time warper 410, and a scenario displayer 420, each of which comprises one or more program modules 42 as described with respect to FIG. 1. In other embodiments, the weather analytical scenarios program module 225 includes additional or fewer components than those shown in FIG. 4. In other embodiments, separate components are integrated into a single computing component or module. Additionally, or alternatively, in embodiments, a single component is implemented as multiple computing components or modules. According to another embodiment, the functions of one or more of the capacity smoother 400, the dynamic time warper 410, and the scenario displayer 420 are provided as services in a distributed computing environment.

In embodiments, the capacity smoother 400 receives, for each of the weather scenarios, the capacity change times predicted by the change predictor 320 as well as the magnitude of the chases predicted by the change quantity predictor 330 and uses a set of predetermined rules to process the predicted capacity change times and magnitudes to smooth out the predictions by reducing or eliminating abrupt drops or spikes in capacity predictions.

In embodiments, the capacity smoother 400 smooths out slight drops or spikes in capacity that are present for less than a predetermined threshold amount of time. In an example, the capacity smoother 400 smooths out drops or spikes in capacity that are present for less than two hours by revising the capacity prediction for that time period to match the capacity prediction for the preceding and/or following time period.

In an example, if the change predictor 320 predicts a capacity change at 2:00 p.m. and the change quantity predictor 330 predicts that capacity drops from 30 departures to 20 departures, and then the change predictor 320 predicts another capacity change at 2:30 p.m. and the change quantity predictor 330 predicts that capacity increases from 20 departures to 30 departure, then the capacity smoother 400 will smooth out the brief drop on capacity from 2:00 p.m. to 2:30 p.m. by revising the predicted capacity such that it remains at 30 departures at 2:00 p.m.

In other embodiments, the capacity smoother 400 smooths out slight drops or spikes in capacity if the magnitude of the drop or spike is less than a predetermined magnitude. In an example, if the magnitude of the drop or spike is less than 10, the capacity smoother 400 revises the capacity prediction for that time period to match the capacity prediction for the preceding and/or following time period.

Still referring to FIG. 4, in embodiments, the dynamic time warper 410 aggregates the plurality of weather scenarios processed by the capacity smoother 400 into a predetermined number of weather analytical scenarios. In particular, the dynamic time warper 410 uses a time-series clustering approach, dynamic time warping, to determine similarities between the plurality of weather scenarios with regard to the capacity change times predicted by the change predictor 320 and the quantity changes predicted by the change quantity predictor 330 and then combine similar capacity predictions together to generate the predetermined number of weather analytical scenarios.

In embodiments, each of the weather analytical scenarios generated by the dynamic time warper 410 includes a predicted arrival/departure capacity at each of a plurality of time intervals (the number of time intervals corresponding to the number of time intervals included in the probabilistic weather forecast). The predetermined number of weather analytical scenarios generated by the dynamic time warper 410 is specified by a user (e.g., three scenarios), determined based upon business rules, or set to a preselected default number.

In an example, if there are 100 weather scenarios, and the predetermined number of weather analytical scenarios is two, then the dynamic time warper 410 aggregates the 100 weather scenarios processed by the capacity smoother 400 into two weather analytical scenarios. Specifically, dynamic time warping is used to combine weather scenarios having similar predictions generated by the change predictor 320 and the change quantity predictor 330. If, using dynamic time warping, the dynamic time warper 410 determines that a first group of 70 scenarios and a second group 30 each have similar predictions generated by the change predictor 320 and the change quantity predictor 330, then the dynamic time warper 410 generates a first weather analytical scenario from the from first group of 70 scenarios using dynamic time warping and generates a second weather analytical scenario from the second group of 30 scenarios using dynamic time warping.

In embodiments, the dynamic time warper 410 determines a probability associated with each of the weather analytical scenarios based upon the percentage of the plurality of weather scenarios that were combined into the weather analytical scenario by the dynamic time warper 410. In the example discussed above, the dynamic time warper 410 determines that the first weather analytical scenario is associated with a 70% probability since it is based on 70 of the 100 weather scenarios, and the second weather analytical scenario is associated with a 30% probability since it is based on 30 of the 100 weather scenarios.

Still referring to FIG. 4, in embodiments, the scenario displayer 420 causes each of the weather analytical scenarios generated by the dynamic time warper 410 to be displayed within a graphical user interface on a display associated with one or more of the client computing devices 250-1, 250-2, . . . , 250-n (of FIG. 2).

Figure 5A:
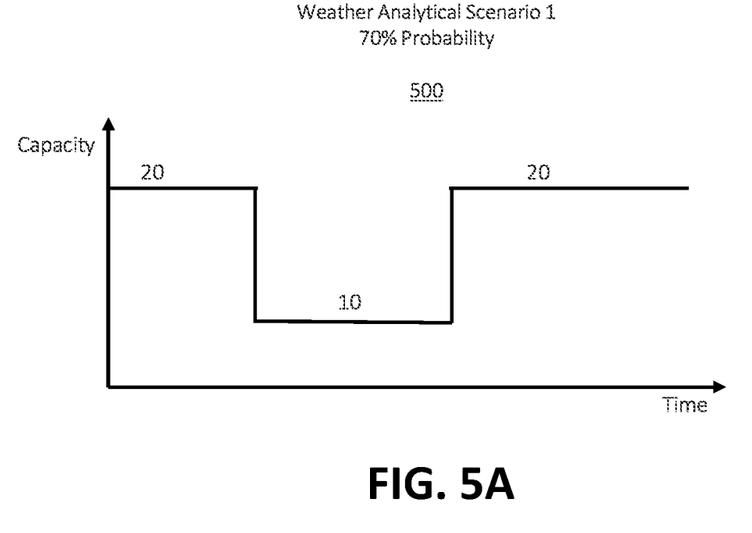
FIGS. 5A and 5B depict exemplary weather analytical scenarios generated in accordance with an embodiment.
Figure 5B:
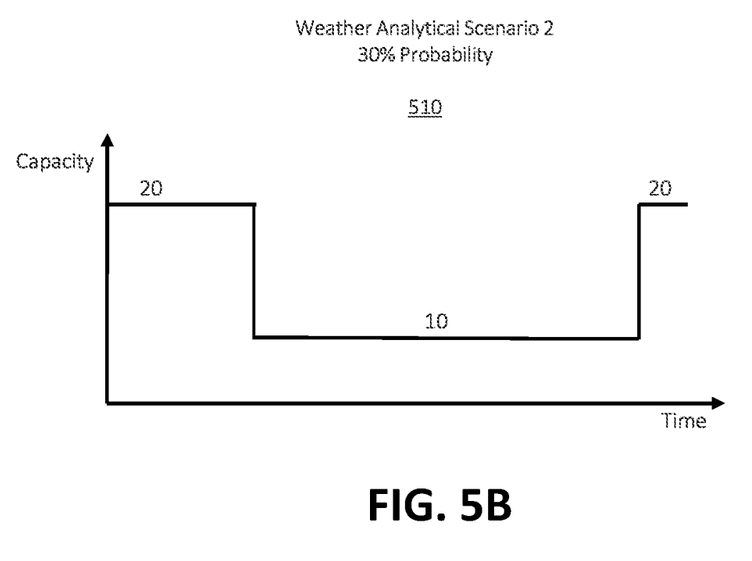

FIGS. 5A and 5B depict exemplary weather analytical scenarios generated in accordance with an embodiment by the dynamic time warper 410 and caused to be displayed by the scenario displayer 420 on the graphical user interface on the display associated with one or more of the client computing devices 250-1, 250-2, . . . , 250-n. In the example of FIG. 5A, Weather Analytical Scenario 1 500 has a 70% probability of occurring and includes a capacity reduction from 20 to 10 for a period of two hours, and in the example of FIG. 5B, Weather Analytical Scenario 2 510 has a 30% probability of occurring and includes a capacity reduction from 20 to 10 for a period of three hours.

Figure 6:
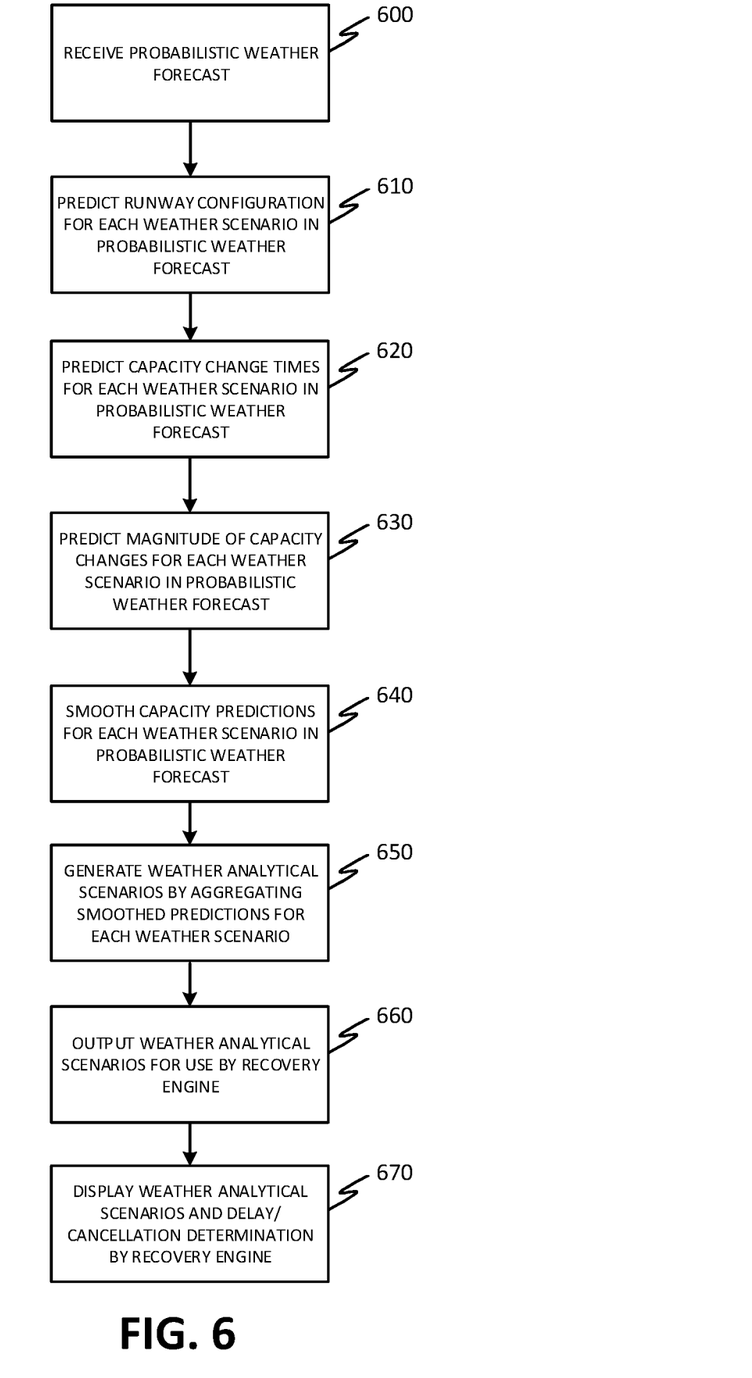
FIG. 6 depicts a flowchart of an exemplary method in accordance with aspects of the invention.

FIG. 6 depicts a flowchart of an exemplary method in accordance with aspects of the invention. The steps of the method are performed in the environment of FIG. 2 and are described with reference to the elements and steps described with respect to FIGS. 1, 2, 3, and 4.

At step 600, the system receives a probabilistic weather forecast. In embodiments, as described with respect to FIG. 3, step 600 comprises the probabilistic weather forecast receiver 300 receiving a probabilistic weather forecast for a particular airport from a service provider (e.g., using a web service) such as the probabilistic weather forecast program module 280 of the probabilistic weather forecast computer server 270.

At step 610, the system predicts a runway configuration for each weather scenario in the probabilistic weather forecast received at step 600. In embodiments, as described with respect to FIG. 3, step 610 comprises the runway configuration predictor 310 using the probabilistic weather forecast for the particular airport received by the probabilistic weather forecast receiver 300 to predict runway configurations at the particular airport using historical data regarding weather conditions and runway configurations from the historical weather and airport operations database 215.

At step 620, the system predicts capacity change times for each weather scenario in the probabilistic weather forecast received at step 600. In embodiments, as described with respect to FIG. 3, step 620 comprises the change predictor 320 using the predicted runway configurations for each scenario from the runway configuration predictor 310 as well as historical data regarding weather conditions, capacity associated with the historical weather conditions, and demand associated with the particular time from the historical weather and airport operations database 215 to predict, for each scenario, the timing of airport capacity changes.

At step 630, the system predicts a magnitude of the capacity changes for each weather scenario in the probabilistic weather forecast received at step 600. In embodiments, as described with respect to FIG. 3, step 630 comprises the change quantity predictor 330 using the runway configurations predicted for each scenario by the runway configuration predictor 310 as well as the capacity change times predicted by the change predictor 320 to predict, for each weather scenario, a magnitude of a capacity change at each of the capacity change times.

At step 640, the system smooths the capacity predictions for each weather scenario generated at step 630. In embodiments, as described with respect to FIG. 4, step 640 comprises the capacity smoother 400 receiving, for each of the weather scenarios, the capacity change times predicted by the change predictor 320 as well as the magnitude of the chases predicted by the change quantity predictor 330 and using a set of predetermined rules to process the predicted capacity change times and magnitudes to smooth out the predictions by reducing or eliminating abrupt drops or spikes in capacity predictions.

At step 650, the system generates weather analytical scenarios by aggregating the smoothed predictions for each weather scenario. In embodiments, as described with respect to FIG. 4, step 650 comprises the dynamic time warper 410 aggregating the plurality of weather scenarios processed by the capacity smoother 400 into a predetermined number of weather analytical scenarios.

At step 660, the system outputs the weather analytical scenarios generated at step 650 for use by the recovery engine 230 (of FIG. 2). In particular, the recovery engine program module 240 of the recovery engine 230 is any program module that receives the weather analytical scenarios and uses the weather analytical scenarios in rules-based decision making regarding specific flights that must be delayed and/or specific flights that must be cancelled in a particular weather analytical scenario. In embodiments, the rules used by the recovery engine 240 are determined by the airline, and the recovery engine 240 outputs information about flights to be delayed and/or flights to be cancelled in a particular weather analytical scenario.

At step 670, the system displays each of the weather analytical scenarios generated at step 650 as well as the information about flights to be delayed and/or flights to be cancelled in each of the weather analytical scenario as determined by the recovery engine 240. In embodiments, as described with respect to FIG. 4, step 670 comprises the scenario displayer 420 causing each of the weather analytical scenarios generated by the dynamic time warper 410 to be displayed within a graphical user interface on a display associated with one or more of the client computing devices 250-1, 250-2, . . . , 250-n (of FIG. 2). In other embodiments, the recovery engine 240 cancels or delays at least one flight based on the weather analytical scenarios.

Figure 7A:
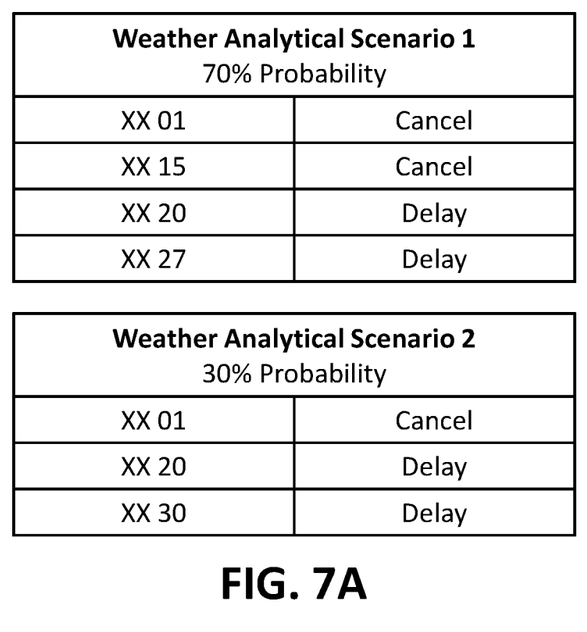
FIGS. 7A and 7B depict examples of information about flights to be delayed and/or flights to be cancelled in two exemplary weather analytical scenarios generated in accordance with an embodiment.
Figure 7B:
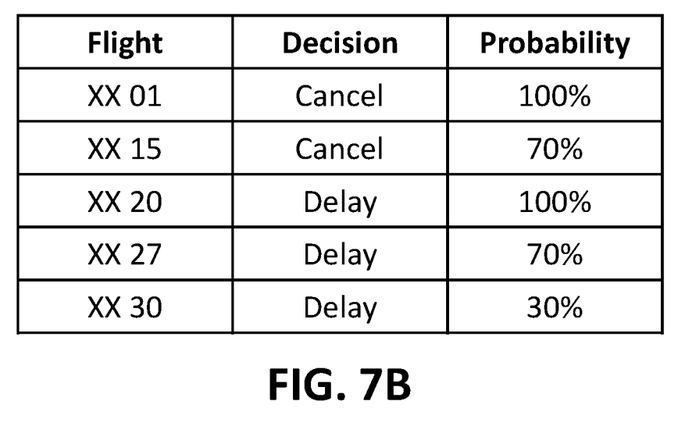

FIGS. 7A and 7B depict examples of information about flights to be delayed and/or flights to be cancelled in two exemplary weather analytical scenarios, generated by the recovery engine program module 240 and displayed at step 670 within a graphical user interface on a display associated with one or more of the client computing devices 250-1, 250-2, . . . , 250-n. In FIG. 7A, in Weather Analytical Scenario 1 (70% probability), flights XX 01 and XX 15 are cancelled and flights XX 20 and XX 27 are delayed. In Weather Analytical Scenario 2 (30% probability), flight XX 01 is cancelled and flights XX 20 and XX 30 are delayed.

In FIG. 7B, the information about flights to be delayed and/or flights to be cancelled is combined across all of the weather analytical scenarios and weighted according to the probability associated with each scenario. In this example, it is determined that flight XX 01 will be cancelled with 100% probability, since it is determined that this flight will be cancelled in both Weather Analytical Scenario 1 and Weather Analytical Scenario 2. Flight XX 15 will be cancelled with 70% probability, since it is determined that this flight will be cancelled in Weather Analytical Scenario 1, which is associated with a 70% probability.

In embodiments, one or more application programming interfaces (APIs) or web services are provided that are queried by the client computing devices 250-1, 250-2, . . . , 250-n and/or the recovery engine computer server 230 to obtain the predictions generated by the airport capacity predictor program module 220 and/or the weather analytical scenarios generated by the weather analytical scenario program module 225.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by a computing device, a probabilistic weather forecast including a plurality of weather scenarios;

determining, by the computing device, airport capacity predictions for each of the plurality of weather scenarios included in the probabilistic weather forecast using a machine learning based airport capacity model that is trained with historic data regarding weather and airport operations comprising flight demand, airport operational conditions, and historical behaviors by air traffic controllers;

smoothing, by the computing device, the airport capacity predictions for each of the plurality of weather scenarios included in the probabilistic weather forecasts by eliminating abrupt drops and abrupt spikes in the airport capacity predictions that occur for less than a predetermined threshold amount of time;

clustering, by the computing device, the airport capacity predictions which have been smoothed into a predetermined number of weather analytical scenarios, the clustering comprising a time-series clustering dynamic time warping approach which determines similarities between the plurality of weather scenarios with regard to predicted capacity change times and predicted quantity changes and combines similar airport capacity predictions together to generate the predetermined number of weather analytical scenarios, wherein the airport capacity predictions are determined using the machine learning based airport capacity model that is a classification model and the historical data regarding runway configuration is used to predict runway configuration of an airport based upon information about runways that are closed for maintenance, forecast information for each of the weather scenarios in the probabilistic weather forecast, and an available number of arrival and departure slots associated with the weather scenarios and the runway configuration of the airport;

generating, by the computing device, a probability of an occurrence of each of the weather analytical scenarios, the probability being based upon a percentage of the airport capacity predictions that are clustered into each respective one of the weather analytical scenarios relative to a total number of the airport capacity predictions;

generating, by the computing device, at least one aggregated airport capacity prediction based on the probabilities of the weather analytical scenarios;

determining, by the computing device, a change in a quantity of flights at the airport based on the at least one aggregated airport capacity prediction, the arrival and departure slots associated with the weather scenarios and the runway configuration, and arrival and departure demand associated with a predetermined time; and canceling or delaying, by the computing device, at least one flight based on the weather analytical scenarios and the airport capacity predictions which are determined using the machine learning based airport capacity model.

2. The method according to claim 1, wherein the probabilistic weather forecast is an ensemble of a plurality of numerical weather models, and the abrupt drops have a drop magnitude less than a first predetermined magnitude.

3. The method according to claim 1, wherein each of the plurality of weather scenarios includes forecast weather data for each of a predetermined number of time intervals, and the abrupt spikes have a spike magnitude less than a second predetermined magnitude.

4. The method according to claim 3, wherein, for each of the plurality of weather scenarios, the airport capacity prediction comprises, for each of the predetermined number of time intervals, a predicted number of aircraft operations able to be accommodated by an airport during the time interval.

5. The method according to claim 3, wherein the forecast weather data includes temperature, dewpoint, windspeed, wind direction, ceiling, and visibility.

6. The method according to claim 1, further comprising building, by the computing device, the classification model using machine learning techniques;

retrieving the historic data regarding the airport operations from an airport operations database, wherein the airport capacity prediction is determined using the classification model.

7. The method according to claim 1, further comprising scoring the airport capacity predictions based on how close they are to actual airport conditions, wherein the actual airport conditions are capacity change times and capacity change magnitudes.

8. A computer program product comprising a computer readable storage medium having program instructions embodied therewith, the program instructions executable by a computing device to cause the computing device to:

receive a probabilistic weather forecast including a plurality of weather scenarios;

determine airport capacity predictions for each of the plurality of weather scenarios included in the probabilistic weather forecast using a machine learning based airport capacity model that includes a classification model that is built with historical data regarding weather conditions, runway configurations, air traffic controller behavior, flight demand, airport operational conditions, and historical behaviors by air traffic controllers;

smooth the airport capacity predictions for each of the plurality of weather scenarios included in the probabilistic weather forecasts by eliminating abrupt drops and abrupt spikes in the airport capacity predictions that occur for less than a predetermined threshold amount of time;

cluster the airport capacity predictions which have been smoothed into a predetermined number of weather analytical scenarios, the clustering comprising a time-series clustering dynamic time warping approach which determines similarities between the plurality of weather scenarios with regard to predicted capacity change times and predicted quantity changes and combines similar airport capacity predictions together to generate the predetermined number of weather analytical scenarios, wherein the airport capacity predictions are determined using the machine learning based airport capacity model that is the classification model and the historical data regarding runway configurations is used to predict runway configuration of an airport based upon information about runways that are closed for maintenance, forecast information for each of the weather scenarios in the probabilistic weather forecast, and an available number of arrival and departure slots associated with the weather scenarios and the runway configuration of the airport;

generate a probability of an occurrence of each of the weather analytical scenarios, the probability being based upon a percentage of the airport capacity predictions that are clustered into each respective one of the weather analytical scenarios relative to a total number of the airport capacity predictions;

generate at least one aggregated airport capacity prediction based on the probabilities of the weather analytical scenarios;

display each of the at least one aggregated airport capacity prediction with an associated probability of the respective aggregated airport capacity prediction;

determine a change in a quantity of flights at the airport based on the at least one aggregated airport capacity prediction, the arrival and departure slots associated with the weather scenarios and the runway configuration, and arrival and departure demand associated with a predetermined time; and canceling or delaying at least one flight based on the weather analytical scenarios and the airport capacity predictions which are determined using the machine learning based airport capacity model.

9. The computer program product according to claim 8, wherein the probabilistic weather forecast is an ensemble of a plurality of numerical weather models, and the abrupt drops have a drop magnitude less than a first predetermined magnitude.

10. The computer program product according to claim 8, wherein each of the plurality of weather scenarios includes forecast weather data for each of a predetermined number of time intervals, and the abrupt spikes have a spike magnitude less than a second predetermined magnitude.

11. The computer program product according to claim 10, wherein, for each of the plurality of weather scenarios, the airport capacity prediction comprises, for each of the predetermined number of time intervals, a predicted number of aircraft operations able to be accommodated by an airport during the time interval.

12. The computer program product according to claim 10, wherein the forecast weather data includes temperature, dewpoint, windspeed, wind direction, ceiling, and visibility.

13. The computer program product according to claim 8, further comprising building, by the computing device, the classification model using machine learning techniques, wherein the airport capacity prediction is determined using the classification model and the historical data regarding the runway configurations are used to predict runway configuration of an airport based upon forecast information for each of the weather scenarios in the probabilistic weather forecast.

14. The computer program product according to claim 8, wherein the weather analytical scenarios are weighed based on a number of the airport capacity predictions in each of the weather analytical scenarios, and generating the at least one aggregated airport capacity prediction comprises combining the weather analytical scenarios according to their respective weightings.

15. A system comprising:
a hardware processor, a computer readable memory, and a computer readable storage medium associated with a computing device;
program instructions configured to receive a probabilistic weather forecast including a plurality of weather scenarios;
program instructions configured to determine airport capacity predictions for each of the plurality of weather scenarios included in the probabilistic weather forecast using a machine learning based airport capacity model that is trained with historic weather data at a point in time, airport operations data at the point in time, flight demand, airport operational conditions, and historical behaviors by air traffic controllers, the airport capacity prediction having a predetermined number of time intervals and a capacity prediction for each of the time intervals;
program instructions configured to smooth the airport capacity predictions for each the plurality of weather scenarios included in the probabilistic weather forecasts by eliminating abrupt drops and abrupt spikes in the airport capacity predications that occur for less than a predetermined threshold amount of time;
program instructions configured to cluster the smoothed airport capacity predictions into a plurality of weather analytical scenarios, the clustering comprising a time-series clustering dynamic time warping approach which determines similarities between the plurality of weather scenarios with regard to predicted capacity change times and predicted quantity changes and combines similar airport capacity predictions together to generate the predetermined number of the weather analytical scenarios,
wherein the airport capacity predictions are determined using the machine learning based airport capacity model that is a classification model and the historical data regarding runway configurations is used to predict runway configuration of an airport based upon information about runways that are closed for maintenance, forecast information for each of the weather scenarios in the probabilistic weather forecast, and an available number of arrival and departure slots associated with the weather scenarios and the runway configuration of the airport;
program instructions configured to generate a probability of an occurrence of each of the weather analytical scenarios, the probability being based upon a percentage of the airport capacity predictions that are clustered into each respective one of the weather analytical scenarios relative to a total number of the airport capacity predictions;
program instructions configured to generate at least one aggregated airport capacity prediction based on the probabilities of the weather analytical scenarios;
program instructions configured to cancel or delay at least one flight based on the at least one aggregated airport capacity prediction;
program instructions configured to determine a change in quantity of flights at the airport based on the at least one aggregated airport capacity prediction, the arrival and departure slots associated with the weather scenarios and the runway configuration, and arrival and departure demand associated with a predetermined time; and
program instructions configured to cancel or delay at least one flight based on the weather analytical scenarios and the airport capacity predictions which are determined using the machine learning based airport capacity model,
wherein the program instructions are stored on the computer readable storage medium for execution by the hardware processor via the computer readable memory.

16. The system according to claim 15, wherein the probabilistic weather forecast is an ensemble of a plurality of numerical weather models.

17. The system according to claim 15, wherein each of the plurality of weather scenarios includes forecast weather data for each of the predetermined number of time intervals.

18. The system according to claim 17, wherein, for each of the plurality of weather scenarios, the airport capacity prediction comprises, for each of the predetermined number of time intervals, a predicted number of aircraft operations able to be accommodated by an airport during the time interval.

19. The system according to claim 15, wherein the machine learning is used to tune the classification model to improve the accuracy of the classification model over time.

20. The system according to claim 15, wherein the abrupt drops have a drop magnitude less than a first predetermined magnitude and the abrupt spikes have a spike magnitude less than a second predetermined magnitude.

* * * * *